United States Patent
Enderle et al.

[11] Patent Number: 5,907,950
[45] Date of Patent: Jun. 1, 1999

[54] SYSTEM FOR INJECTING NITROGEN-OXIDE-REDUCING AGENTS INTO AN EXHAUST STREAM

[75] Inventors: Christian Enderle, Baltmannsweiler; Alois Raab, Aalen; Martin Teigeler, Stuttgart; Friedrich Wirbeleit, Esslingen, all of Germany

[73] Assignee: Daimler-Benz Aktiengesellschaft, Stuttgart, Germany

[21] Appl. No.: 08/967,542

[22] Filed: Nov. 12, 1997

[30] Foreign Application Priority Data

Nov. 12, 1996 [DE] Germany .......................... 196 46 643

[51] Int. Cl.⁶ ....................................................... F01N 3/00
[52] U.S. Cl. .................... 60/286; 60/301; 60/303
[58] Field of Search ........................... 60/284, 286, 280, 60/294, 303, 301

[56] References Cited

FOREIGN PATENT DOCUMENTS

| | | |
|---|---|---|
| 0 381 236 A1 | 2/1990 | European Pat. Off. . |
| 0 586 913 A2 | 8/1993 | European Pat. Off. . |
| 30 12 946 | 10/1980 | Germany . |
| 38 21 832 C1 | 11/1989 | Germany . |
| 41 26 705 A1 | 2/1993 | Germany . |
| 42 03 807 A1 | 8/1993 | Germany . |
| 195 31 740 A1 | 7/1996 | Germany . |
| 3-206314 | 9/1991 | Japan . |

*Primary Examiner*—Thomas E. Denion
*Attorney, Agent, or Firm*—Evenson McKeown Edwards & Lenahan PLLC

[57] ABSTRACT

A method and apparatus for injecting a nitrogen-oxide-reducing agent into an exhaust stream that has an injector unit for controlled injection of a reducing agent into the exhaust stream and an injection element that incorporates a micromechanical spray jet element.

16 Claims, 2 Drawing Sheets

SYSTEM FOR INJECTING NITROGEN-OXIDE-REDUCING AGENTS INTO AN EXHAUST STREAM

BACKGROUND AND SUMMARY OF THE INVENTION

This application claims the priority of German patent document 196 46 643.1, the disclosure of which is expressly incorporated by reference herein.

The invention relates to a system for injecting a nitrogen-oxide-reducing agent into an exhaust stream, especially for an internal combustion engine and an injection element for controlled injection of reducing agent into the exhaust stream.

In combustion processes with a surplus of air, catalytic reduction of the nitrogen oxides that are emitted is not possible without an additional reducing agent. As a remedy, so-called selective catalytic reduction is known from power plant design, in which a reducing agent, for example ammonia or water-dissolved urea, is injected into the exhaust stream upstream from a catalyst. The injected ammonia and/or the ammonia that is released during the pyrolysis of urea reduces the nitrogen oxides in the catalyst to form molecular nitrogen and water. Therefore, a selective catalytic nitrogen oxide reduction for internal combustion engines has also already been proposed, with a suitable reducing agent being injected by conventional injection technology into the combustion chamber or the adjoining exhaust line upstream from an exhaust catalyst. In addition, chemical and physical conditions can be created in the exhaust stream of an internal combustion engine that permit reduction of the nitrogen oxides contained therein, even without a catalyst. This method is termed selective non-catalytic reduction and following conventional injection of the reducing agent, requires that it first be evaporated, increasing the required residence time. It is therefore primarily suitable for engines operating at low rpm.

A system for injecting ammonia into the exhaust stream of a Diesel engine is known from Offenlegungsschrift EP 0 381 236 A1. In that document, a pressurized storage container is provided for the ammonia used as the reducing agent, together with a corresponding supply line and a conventional injection nozzle located upstream from a catalyst for injecting the ammonia into the exhaust stream. The moisture content and temperature of the intake air, fuel consumption, power, and exhaust temperature of the Diesel engine are determined by sensors. Depending on these input values, a control unit controls the quantity of ammonia injected into the exhaust stream by a control valve.

Patent DE 38 21 832 C1 describes an exhaust system for a piston engine with an exhaust turbocharger, said engine being designed for selective non-catalytic nitrogen oxide reduction. An injection element is located upstream of the exhaust turbocharger at a junction of various branches of the exhaust system, said element incorporating a plurality of nozzle openings. By means of a delivery pump, ammonia is added under pressure through an atomizer nozzle to a mixing chamber located upstream of the nozzle openings and mixed there with a carrier gas. The ammonia-carrier gas mixture is then sprayed through the nozzle openings into the exhaust stream under pressure, said pressure being generated by compressors that supply the carrier gas as well as compressed air. The nozzle can be located so that it is axially displaceable in the vicinity of the junction.

Offenlegungsschrift JP 3-206314 (A) teaches an injection device that serves to inject gaseous ammonia into the exhaust stream of a Diesel engine and is located upstream from an exhaust catalyst. A supply tank, with the aid of a compressed gas tank, feeds aqueous ammonia solution into heating tubes introduced transversely into an exhaust line, said tubes terminating in an evaporation-expansion chamber. The evaporation-expansion chamber located in the exhaust line is supplied with evaporated ammonia solution by the heating tubes. The heated gaseous ammonia passes from the evaporation-expansion chamber through a porous nozzle into the exhaust stream.

A conventional atomizer nozzle that can be used for injecting a reaction medium, urea for example, into an exhaust stream is described in Offenlegungsschrift EP 0 586 913 A2. A mixing chamber located outside the atomizer nozzle is supplied with gas under pressure and a liquid reaction medium. The reaction medium-gas mixture produced in the mixing chamber passes through a mixing line into a nozzle prechamber of the atomizer nozzle, provided with a screen. The mixture is accelerated through an intermediate nozzle and enters the main chamber of the atomizer nozzle where further mixing occurs. The reaction medium-gas mixture passes from the main chamber through nozzle openings into the exhaust stream upstream from a catalyst.

Micromechanical spray jet elements that have a plurality of fine nozzle openings through which a supplied fluid is delivered in the form of fine streams by means of a pulsed pressure produced locally in the vicinity of the nozzle openings are used in ink jet printers. To produce local pressure, electrical heating resistors are used in so-called "bubble jet" printers, while piezoelectrically actuated membranes are used in "piezo jet" printers. By means of the micromechanical spray jet element, ink or printing ink is sprayed onto paper, with the very small nozzle openings producing fine distribution and hence a high spatial resolution. Ink jet printer nozzles of these designs are described for example in Offenlegungsschriften DE 30 12 936 A1 and DE 195 31 740 A1.

The invention has as the technical problem to be solved the provision of a system with which a reducing agent can be added to the exhaust stream at relatively low cost and with comparatively good mixing.

The invention achieves this goal by providing a system with a micromechanical injection element and a reducing agent injection control unit. In this system, the nitrogen-oxide-reducing agent is injected into the exhaust stream of an internal combustion engine through a controllable injection unit that contains a micromechanical spray jet element that uses technology found in ink jet printers, with the reducing agent being sprayed controllably into the exhaust stream with good mixing through a plurality of fine nozzle openings in the form of fine streams by means of locally generated pulsed pressure. The use of micromechanical spray jet elements with local pressure generation limited to the nozzle opening area has a simple system design, without any pressure-carrying lines or separate pressure pumps. A reducing agent injection control unit controls the injection time and/or the volume of reducing agent injected into the exhaust stream of an internal combustion engine, at least as a function of the engine rpm, engine load, crankshaft angle, and/or exhaust temperature. By means of this injection that depends upon the operating parameters, good nitrogen oxide reduction in the exhaust stream is achieved and at the same time overdosage of reducing agent is avoided.

In one embodiment, heating resistance elements are specially provided in the vicinity of the respective nozzle openings as means for local pressure generation, by which elements the reducing agent supplied in liquid form is locally superheated and consequently injected in the form of fine vapor streams into the exhaust stream. Preliminary reactions that have a positive effect on later reduction of nitrogen oxides can be triggered during the injection process by virtue of injection in the vaporized state, and mixing of reducing agent with the exhaust stream is facilitated.

In another embodiment, the means for local pressure generation are designed specially as piezoelectrically operated membranes located in the vicinity of the respective nozzle openings. The use of a piezoelectrically operated spray jet element of this kind permits especially accurate metering of the injected reducing agent.

In another embodiment, the nozzle openings are distributed over a large area along the exhaust flow path. The reducing agent can therefore be added at relatively low cost to the exhaust stream, with comparatively good mixing and distribution.

In another embodiment, provision is made for selective non-catalytic nitrogen oxide reduction in an internal combustion engine such that the nozzle openings terminate in the combustion chamber and/or in the exhaust manifold and/or directly upstream from the exhaust turbine of an exhaust turbocharger, and the injection control unit triggers injection of reducing agent only when the exhaust temperature is higher than a predetermined minimum temperature. The temperature is chosen so that injection of reducing agent is prevented when the exhaust temperature is insufficient for nitrogen oxide reduction.

In another embodiment, provision is made for selective catalytic nitrogen oxide reduction by an exhaust catalyst located in the exhaust flow path such that the nozzle openings terminate in the exhaust flow path upstream of the catalyst and the control unit triggers injection of reducing agent only when the exhaust temperature is higher than a predetermined minimum.

Other objects, advantages and novel features of the present invention will become apparent from the following detailed description of the invention when considered in conjunction with the accompanying drawings.

DETAILED DESCRIPTION OF THE DRAWINGS

Figure 1:
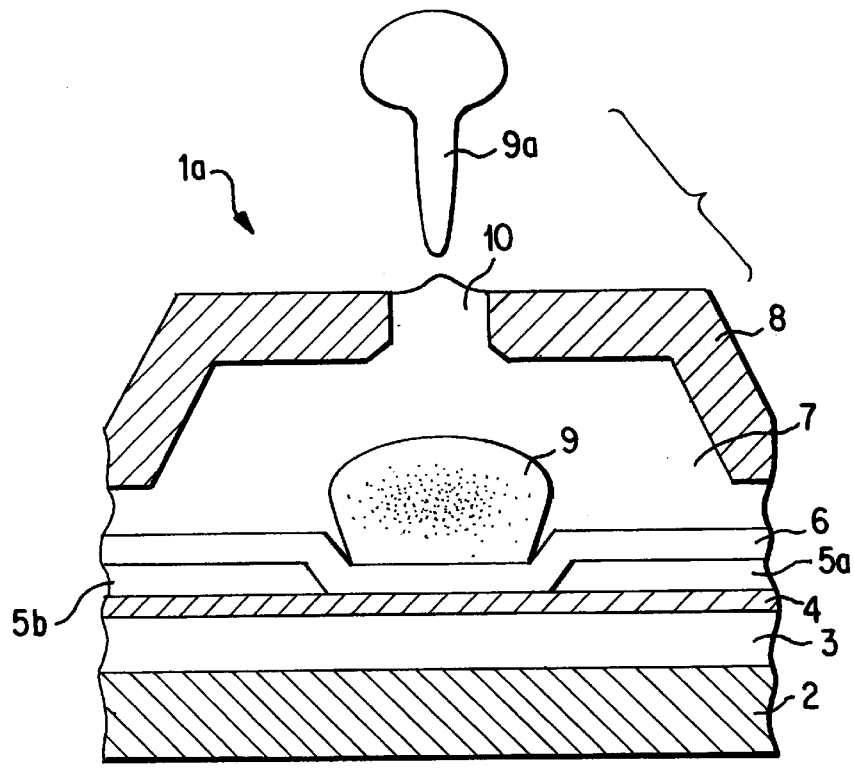
FIG. 1 is a cutaway sectional view of a micromechanical spray jet element with heating resistance elements as part of an injection element of a system for injecting a nitrogen-oxide-reducing agent into the exhaust stream of an internal combustion engine.

The micromechanical spray jet element 1a shown in section in FIG. 1 for injecting a nitrogen-oxide-reducing agent into the exhaust stream of an internal combustion engine incorporates a substrate 2, upon which a thermal barrier 3 is located, on which substrate an electrical resistance layer 4 is applied, said layer being contacted by leads 5a, 5b. An insulating and passivation layer 6 is located on leads 5a, 5b and resistance layer 4, said layer 6 serving for electrical insulation and as protection against chemically aggressive reducing agents. Above insulating and passivation layer 6 is a nozzle chamber 7 supplied with a liquid nitrogen oxide reducing agent and delimited above by a nozzle plate 8. A plurality of micromechanically fine nozzle openings 10 is made in nozzle plate 8, one of said openings being visible in FIG. 1. In the area below each nozzle opening 10, leads 5a, 5b are broken so that insulating and passivating layer 6 rests directly on resistance layer 4 at this point. This design corresponds to the "bubble jet" technology used in ink jet printer nozzles.

When resistance layer 4 is supplied with electrical energy through leads 5a and 5b, its middle area that serves as a heating resistance element warms up suddenly beneath the corresponding nozzle opening 10 and the reducing agent in this area, separated therefrom only by insulating and passivation layer 6, is superheated locally at this point. As a result, an explosive local evaporation of the reducing agent takes place and a corresponding local pressure is produced, as indicated schematically in FIG. 1 by a vapor bubble 9 that has formed. As a result, reducing agent escapes from nozzle openings 10 in the form of fine vapor streams and thus is injected into the exhaust stream, finally distributed and well mixed. A reducing agent vapor bubble 9a that has just emerged is shown schematically in FIG. 1 above nozzle opening 10. If the current supplied to resistance layer 4 is interrupted, the layer cools off and no further reducing agent is expelled from nozzle openings 10. By evaporating the reducing agent before it is injected into the exhaust stream, thermal preparation takes place as early as the injection element. In this way, positive preliminary reactions of the respective reducing agent can be triggered that are positive for later nitrogen oxide reduction, such as thermal pyrolysis of urea or thermal cracking of Diesel fuel to form hydrocarbon radicals for example.

Figure 2:
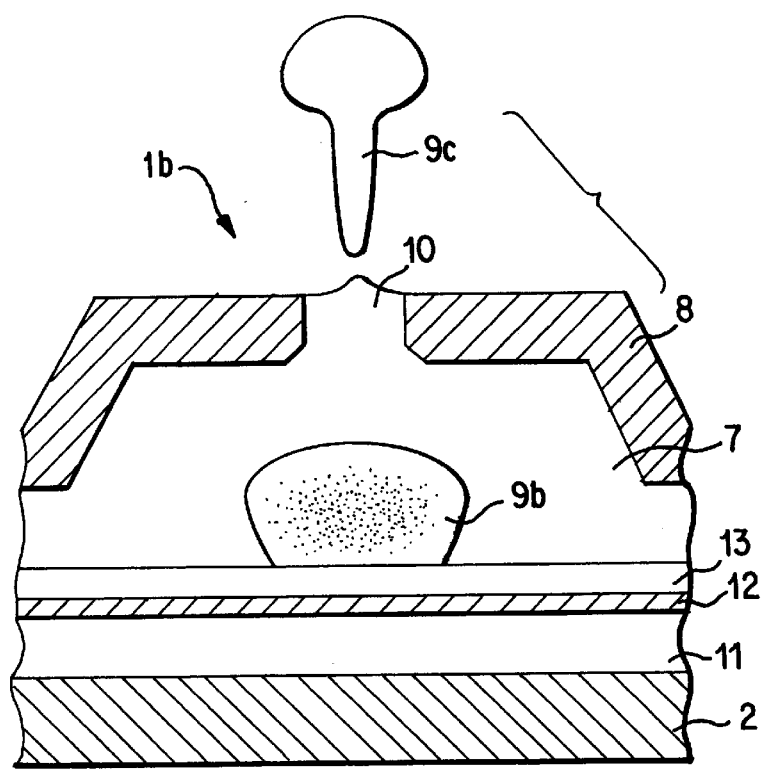
FIG. 2 is a cutaway sectional view of a micromechanical spray jet element with piezoelectrically controllable membranes as part of an injection element of a system for injecting a nitrogen oxide reducing agent into the exhaust stream of an internal combustion engine.

FIG. 2 shows another micromechanical spray jet element 1b, with the elements that have the same functions as in the example in FIG. 1 being given the same reference numbers. An intermediate layer 11 is located on a substrate 2, with a laminar piezoelement 12 formed on said intermediate layer. Piezoelement 12 is connected in suitable fashion by leads, not shown. A membrane 13 is mounted on piezoelement 12, said membrane separating the piezoelement from the liquid reducing agent that is located above membrane 13 in nozzle chamber 7. Nozzle chamber 7 is delimited above by nozzle plate 8 with fine nozzle openings 10 provided therein. The application of a suitable electrical field through the leads, not shown, to piezoelement 12 causes a deflection of said element locally in the area below the respective nozzle opening 10 and hence a deflection of membrane 13 upward as well. As a result, local pressure develops in nozzle chamber 7, causing reducing agent in the form of a fine stream of microdroplets 9b, 9c to escape from the respective nozzle opening 10. By using piezoelectric actuation of membrane 13, very exact metering of the reducing agent volume that escapes through nozzle openings 10 is possible. This principle corresponds to the "piezo jet" technology used by ink jet printer nozzles.

In the embodiments shown in FIGS. 1 and 2, a common feature is that the pressure required for injection is generated locally directly in the respective nozzle opening area, and accordingly no pressure-carrying lines or separate pressure pumps are required. Because of the small dimensions of the nozzle openings and the large number of nozzle openings which preferably are located over a large surface along the exhaust flow path, good, thorough mixing and comparatively homogeneous and fine distribution of the reducing agent in the exhaust stream are achieved.

Figure 3:
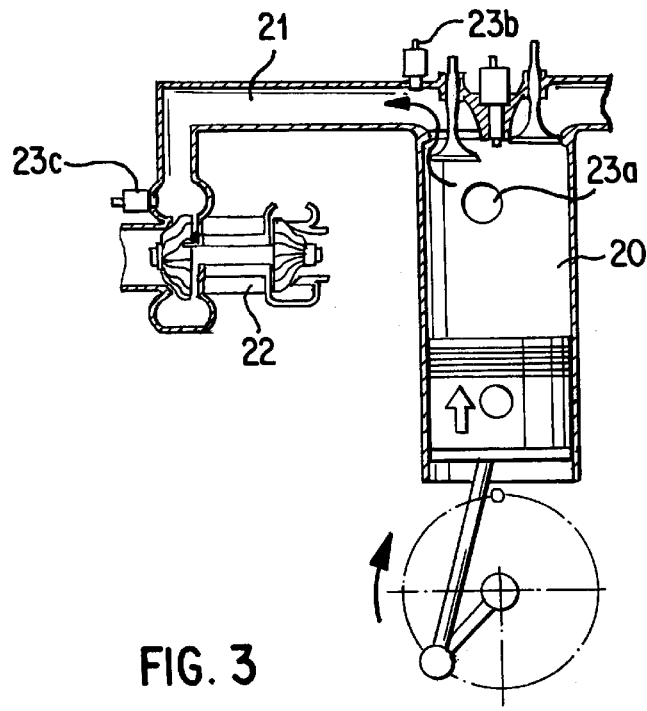
FIG. 3 is a schematic view of a piston engine with a system for injecting a nitrogen oxide reducing agent into the exhaust stream for selective non-catalytic nitrogen oxide reduction.

FIG. 3 shows a schematic diagram of a piston engine with a system according to the invention for injecting a nitrogen-oxide-reducing agent into the exhaust stream for selective noncatalytic nitrogen oxide reduction. The piston engine for example can be a quality-regulated Diesel engine operated with surplus air or a gasoline engine with lean operation, in other words, with a super-stoichiometric air/fuel ratio. A combustion chamber 20 is connected to an exhaust manifold 21 with an exhaust turbocharger 22. The reducing agent injection system incorporates three injection elements 23a, 23b, and 23c located at various points along the exhaust stream path.

The first injection element 23a is located in the combustion chamber of the piston engine and is merely indicated in FIG. 3. The second injection element 23b is located in exhaust manifold 21 at the cylinder head, while the third injection element 23c is located immediately upstream of the exhaust turbine of exhaust turbocharger 22. In this position, temperature and turbulence boundary conditions prevail that favor effective noncatalytic nitrogen oxide reduction by the injected reducing agent. Each injection element incorporates a micromechanical spray jet element of a design described in FIGS. 1 and 2, so that at each of the three injection points, an extensive arrangement of micromechanically fine nozzle openings is provided. In particular, this leads to extensive distribution of nozzle openings along the exhaust flow path, which also permits good thorough mixing of the reducing agent with the exhaust and hence an efficient noncatalytic nitrogen reduction. It is understood that as an alternative, an injection element can be mounted in only one or two of the three positions shown.

Injection elements 23a, 23b, and 23c are supplied with reducing agent by conventional devices, not shown. The control of the injection elements is performed by a control unit, not shown. The control unit signals injection of reducing agent into the exhaust stream only when the exhaust temperature in the cylinder of the piston engine is higher than a predetermined temperature that is necessary for noncatalytic reduction of nitrogen oxide with the reducing agent being used. This avoids in particular any secondary contamination of the exhaust by nonreacting reducing agent. Theoretically, pressure generation in injection elements 23a, 23b, and 23c is limited to the injection times. In addition, no pressure-carrying lines with corresponding seals are required.

Figure 4:
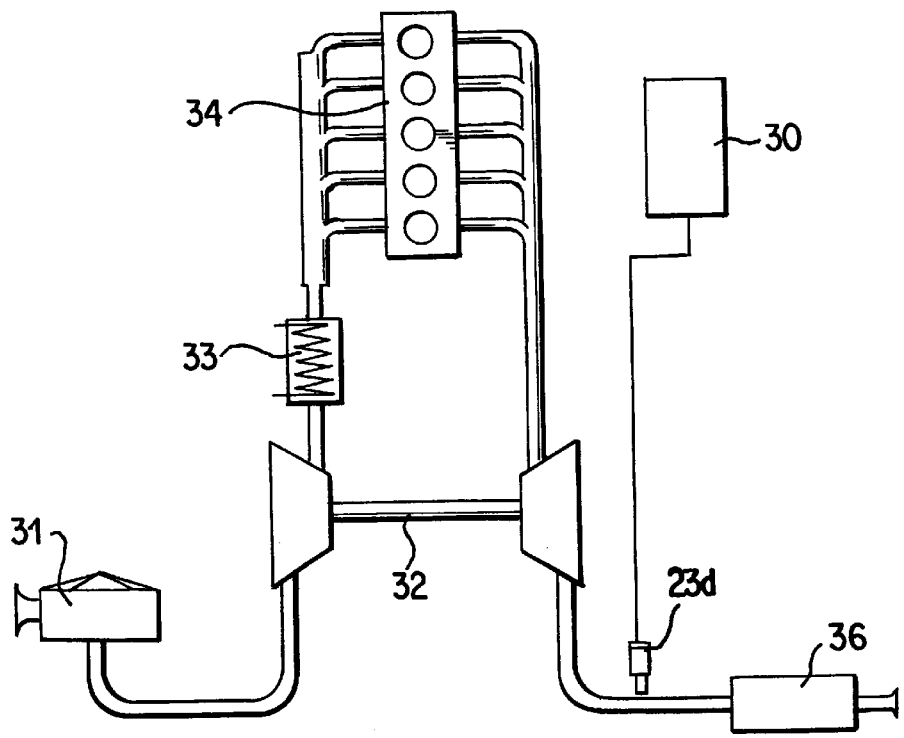
FIG. 4 is a schematic view of a piston engine with a system for injecting a nitrogen-oxide-reducing agent into the exhaust stream for selective catalytic nitrogen oxide reduction.

FIG. 4 shows another piston engine provided with a system according to the invention for selective catalytic nitrogen oxide reduction. This piston engine can equally well be a quality-regulated Diesel engine for example, operated with surplus air, or a gasoline engine operated with a lean mixture. Intake air passes through an air filter and intake noise muffler 31 to the compressor of an exhaust turbocharger 32. The compressed air is conducted through a boost air cooler 33 and enters combustion chamber 34 of the piston engine. The exhaust from the piston engine drives the exhaust turbine in exhaust turbocharger 32. Downstream from the exhaust turbine and upstream from an exhaust catalyst 36, there is an injection element 23d which contains a micromechanical spray jet element according to FIG. 1 or 2, for spraying reducing agent into the exhaust stream. The fine nozzle openings of injection element 23d are distributed over a large area upstream from exhaust catalyst 36 and permit good, thorough mixing of the injected reducing agent, with a comparatively simple design for injection element 23d.

A control unit 30 controls the injection time and injection volume of reducing agent as a function of engine rpm, engine load, crankshaft angle, and exhaust temperature. These parameters are detected by sensors, not shown. The injection can be tuned to the existing engine operating conditions, permitting extensive nitrogen oxide reduction in the exhaust. In the present case of selective catalytic nitrogen oxide reduction, the exhaust temperature is measured in the area upstream from catalyst 36, and control unit 30 causes reducing agent to be injected only when the exhaust temperature is above a predetermined minimum temperature for catalytic activity. As a result, no reducing agent enters the exhaust stream as long as a catalyst is still not yet functioning because the operating temperature is too low.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for injecting a nitrogen-oxide-reducing agent into an exhaust stream, for an internal combustion engine, comprising an injection element for controlled injection of the reducing agent into the exhaust stream, said element having a micromechanical spray nozzle element that injects the reducing agent into the exhaust stream through a plurality of fine nozzle openings in the form of fine streams by means of local pulsed pressure generation, with heating resistance elements being provided as the means for local pressure generation in the vicinity of the respective nozzle openings, with which elements the reducing agent supplied in liquid form is superheated locally and consequently injected into the exhaust stream in the form of fine vapor streams, and controlling with a reducing agent injection control unit that controls at least one of the injection time and the injection volume of reducing agent into the exhaust stream of internal combustion engine at least as a function of at least one of the engine rpm, engine load, crankshaft angle, and exhaust temperature.

2. A method according to claim 1 further characterized in that the nozzle openings are distributed over a large volume along the exhaust flow path.

3. A method according to claim 1, further characterized in that the nozzle openings terminate in at least one of the combustion chamber and in the exhaust manifold and directly upstream of an exhaust turbine of an exhaust turbocharger, into the exhaust flow path of an internal combustion engine and the injection control unit that causes injection of the reducing agent only when the exhaust temperature is higher than a minimum than is required for non-catalytic nitrogen oxide reduction.

4. A method according to claim 1, further characterized in that the nozzle openings in the exhaust flow path terminate upstream from an exhaust catalytic converter of an internal combustion engine and the injection control unit causes injection of reducing agent only when the exhaust temperature is higher than a previously determined minimum temperature for catalyst activity.

5. System for injection of a nitrogen oxide reduction medium into an exhaust stream, for an internal combustion engine, comprising an injection element for controlled injection of reducing agent into the exhaust stream, said element incorporating a micromechanical spray jet element that sprays the reducing agent controllably into the exhaust stream through a plurality of fine nozzle openings in the form of fine streams by means of local pulsed pressure generation, with piezoelectrically actuated membranes being provided as the means for local pressure generation in the vicinity of the respective nozzle openings, and a reducing agent injection control unit that controls at least one of the injection time and the injection volume of reducing agent into the exhaust stream of the internal combustion engine, at least as a function of at least one of the engine rpm, engine load, crankshaft angle, and exhaust temperature.

6. A method according to claim 2 further characterized in that the nozzle openings are distributed over a large volume along the exhaust flow path.

7. A method according to claim 2, further characterized in that the nozzle openings terminate in at least one of the combustion chamber and in the exhaust manifold and directly upstream of an exhaust turbine of an exhaust turbocharger, into the exhaust flow path of an internal combustion engine and the injection control unit that causes injection of the reducing agent only when the exhaust temperature is higher than a minimum than is required for non-catalytic nitrogen oxide reduction.

8. A method according to claim 2, further characterized in that the nozzle openings in the exhaust flow path terminate upstream from an exhaust catalytic converter of an internal combustion engine and the injection control unit causes injection of reducing agent only when the exhaust temperature is higher than a previously determined minimum temperature for catalyst activity.

9. An apparatus for injecting a nitrogen-oxide-reducing agent into an exhaust stream, for an internal combustion engine, comprising an injection element for controlled injection of the reducing agent into the exhaust stream, said element having a micromechanical spray nozzle element that injects the reducing agent into the exhaust stream through a plurality of fine nozzle openings in the form of fine streams by means of local pulsed pressure generation, with heating resistance elements being provided as the means for local pressure generation in the vicinity of the respective nozzle openings, with which elements the reducing agent supplied in liquid form is superheated locally and consequently injected into the exhaust stream in the form of fine vapor streams, and controlling with a reducing agent injection control unit that controls at least one of the injection time and the injection volume of the reducing agent into the exhaust stream of the internal combustion engine at least as a function of at least one of the engine rpm, engine load, crankshaft angle, and exhaust temperature.

10. An apparatus according to claim 9 further characterized in that the nozzle openings are distributed over a large volume along the exhaust flow path.

11. An apparatus according to claim 9, further characterized in that the nozzle openings terminate in at least one of the combustion chamber and in the exhaust manifold and directly upstream of an exhaust turbine of an exhaust turbocharger, into the exhaust flow path of an internal combustion engine and the injection control unit that causes injection of the reducing agent only when the exhaust temperature is higher than a minimum than is required for non-catalytic nitrogen oxide reduction.

12. An apparatus according to claim 9, further characterized in that the nozzle openings in the exhaust flow path terminate upstream from an exhaust catalytic converter of an internal combustion engine and the injection control unit causes injection of reducing agent only when the exhaust temperature is higher than a previously determined minimum temperature for catalyst activity.

13. An apparatus for injection of a nitrogen oxide reduction medium into an exhaust stream, for an internal combustion engine, comprising an injection element for controlled injection of reducing agent into the exhaust stream, said element incorporating a micromechanical spray jet element that sprays the reducing agent controllably into the exhaust stream through a plurality of fine nozzle openings in the form of fine streams by means of local pulsed pressure generation, with piezoelectrically actuated membranes being provided as the means for local pressure generation in the vicinity of the respective nozzle openings, and a reducing agent injection control unit that controls at least one of the injection time and the injection volume of the reducing agent into the exhaust stream of the internal combustion engine, at least as a function of at least one of the engine rpm, engine load, crankshaft angle, and exhaust temperature.

14. An apparatus according to claim 13, further characterized in that the nozzle openings are distributed over a large volume along the exhaust flow path.

15. An apparatus according to claim 13, further characterized in that the nozzle openings terminate in at least one of the combustion chamber and in the exhaust manifold and directly upstream of an exhaust turbine of an exhaust turbocharger, into the exhaust flow path of an internal combustion engine and the injection control unit that causes injection of the reducing agent only when the exhaust temperature is higher than a minimum than is required for non-catalytic nitrogen oxide reduction.

16. An apparatus according to claim 10, further characterized in that the nozzle openings in the exhaust flow path terminate upstream from an exhaust catalytic converter of an internal combustion engine and the injection control unit causes injection of reducing agent only when the exhaust temperature is higher than a previously determined minimum temperature for catalyst activity.

\* \* \* \* \*